United States Patent [19]

Thiele et al.

[11] Patent Number: 5,166,802

[45] Date of Patent: Nov. 24, 1992

[54] TELEVISION RECEIVER WITH LOUDSPEAKER ENCLOSURE

[75] Inventors: Karl-Heinz A. A. O. Thiele, Peine; Werner Stehn, Hemmingen, both of Fed. Rep. of Germany

[73] Assignee: Electronic-Werke Deutschland GmbH, Villingen-Schwenningen, Fed. Rep. of Germany

[21] Appl. No.: 697,740

[22] Filed: May 3, 1991

Related U.S. Application Data

[63] Continuation of Ser. No. 345,311, Apr. 20, 1989, abandoned.

[51] Int. Cl.$^5$ .............................................. H04N 5/64
[52] U.S. Cl. ...................................... 358/254; 381/24; 381/90; 312/7.2
[58] Field of Search ............... 358/229, 254; D14/199, D14/5, 194, 193; 312/7.2; 455/348, 350; 381/24, 90

[56] References Cited

U.S. PATENT DOCUMENTS

D. 281,494  11/1985  Sujanani Vinod ................. D14/194
4,646,349   2/1987   Puls .................................... 381/24

FOREIGN PATENT DOCUMENTS

| 304629 | 1/1989 | European Pat. Off. . |
| 622528 | 6/1961 | Italy ................................... 358/254 |
| 0037183 | 2/1989 | Japan . |
| 0060160 | 3/1989 | Japan . |

Primary Examiner—James J. Groody
Assistant Examiner—Michael H. Lee
Attorney, Agent, or Firm—Joseph S. Tripoli; Peter M. Emanuel; Robert D. Shedd

[57] ABSTRACT

Locking apparatus wherein the locking of the form-fit structure of locking is divided into two movements with the two directions of being generally perpendicular to each other. In the first movement, the snap-in elements are pre-stressed whereby the final locking does not yet occur. It is only in the second movement in a direction approximately perpendicular to the first movement that the final locking occurs by the locking of the snap-in elements. This division of directions permits the keeping of the movement distance for connection as short as desired even in tight spatial circumstances.

12 Claims, 3 Drawing Sheets

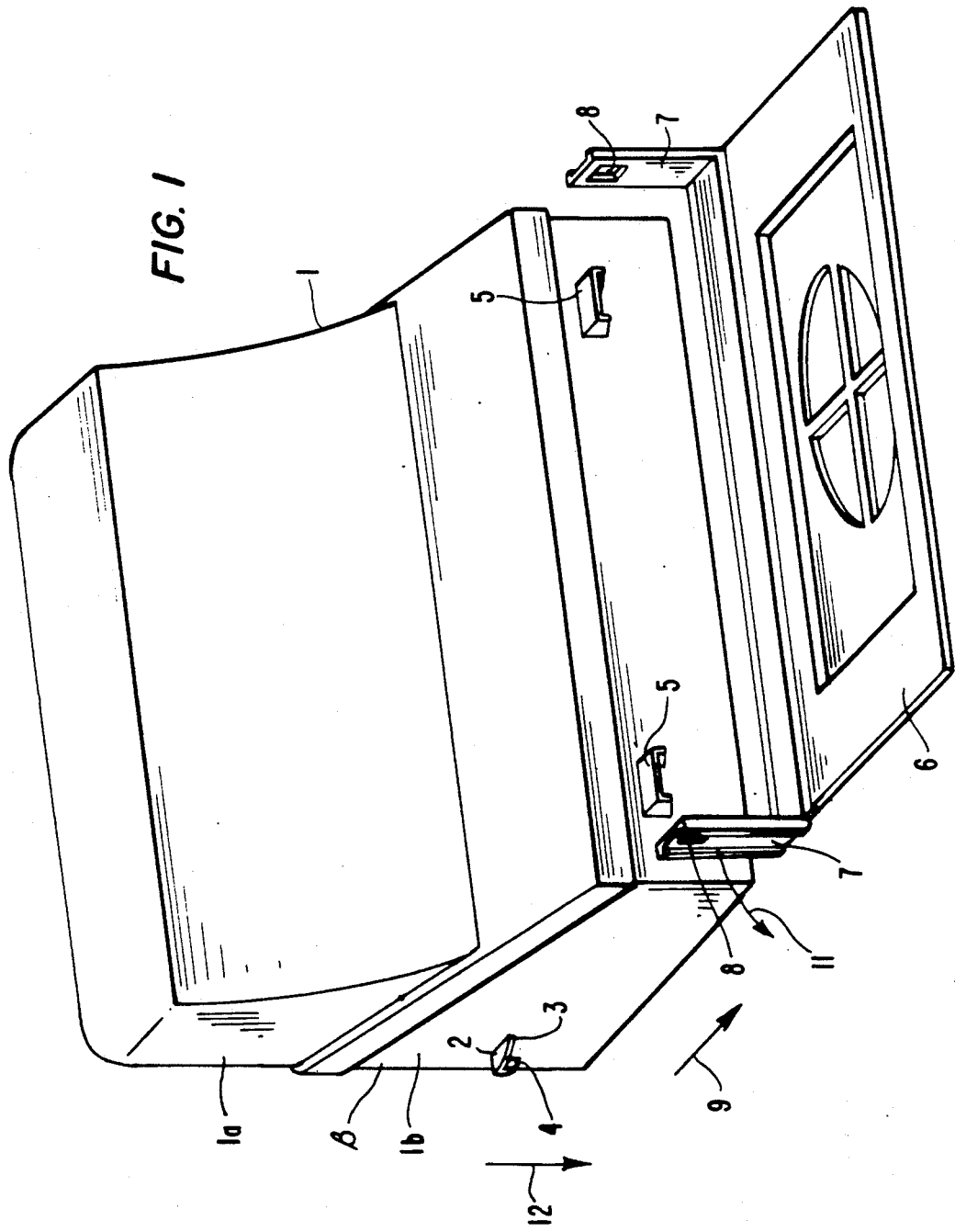

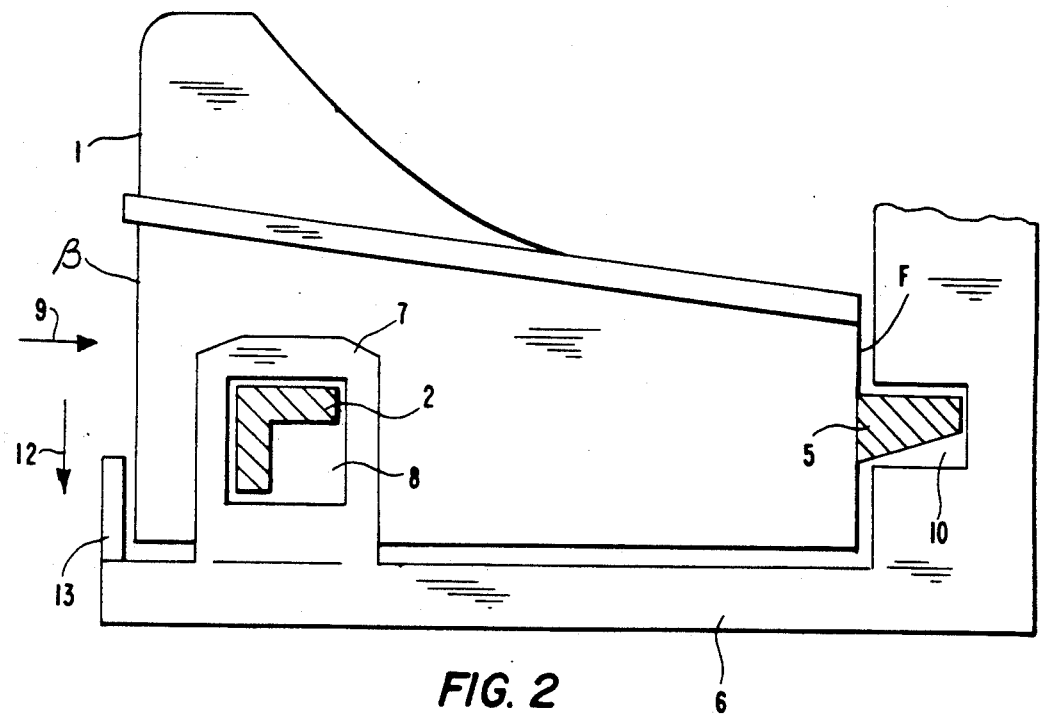
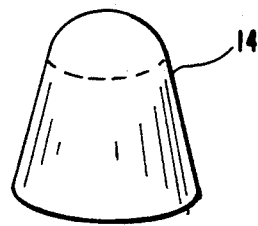
FIG. 3
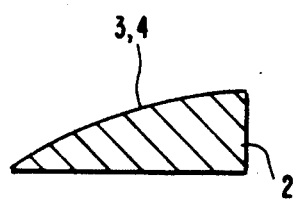
FIG. 4

TELEVISION RECEIVER WITH LOUDSPEAKER ENCLOSURE

This is a continuation of U.S. patent application Ser. No. 345,311, filed Apr. 20, 1989, now abandoned.

BACKGROUND

The present invention concerns television receivers speaker enclosures for high quality stereophonic loudspeakers.

It is known in high quality stereophonic television receivers to build into the case of the receiver, at each of the left and right side of the picture tube, a complete loudspeaker enclosure with each enclosure having one or more high quality loudspeakers.

In order to avoid a screw fastener connection between assembled parts of the enclosure, it is also known to fasten the loudspeaker enclosures to the case of the television receiver by means of a form-fit snap-in connection, a so-called "Snap-in", whereby the locking generally occurs through a translational motion, a rocking motion or a swivelling movement to place one member into proper position so that the form-fit means of locking will locked in.

It is desirable in television receivers to try to keep the space between the side wall of the case and the picture tube as small as possible so that the overall width of the case does not become too large. In order to utilize this space in an optimized way for a loudspeaker enclosure which is desired to be as large as possible, it has been suggested to adapt the shape of the loudspeaker enclosure to the shape of the picture tube in such a way that the back end of the loudspeaker enclosure extends further into the interior of the case than at the front end since the picture tube narrows towards the neck. A portion of the unused space between the side wall of the case and the picture tube is then occupied by the loudspeaker enclosure. Because in assembly the picture tube has to be installed into the case before the loudspeaker enclosures are attached, the room for "snap-in" movement as discussed hereinabove is no longer sufficient for a pure translational motion to obtain a form-fit snap-in connection between the loudspeaker enclosures and the case with sufficient stability for the relatively large loudspeaker enclosure since a movement perpendicular to the case wall or a rocking motion are impracticable.

Thus, it is an object of the invention to create a secure form-fit snap-in connection between a loudspeaker enclosure and a television receiver case which requires only minimal movement during the locking process.

SUMMARY OF THE INVENTION

Briefly, apparatus for the locking of the form-fit means of locking is divided into two movements with the two directions of being generally perpendicular to each other. In the first movement, the snap-in elements are pre-stressed whereby the final locking of the apparatus does not yet occur. It is only in the second movement in a direction approximately perpendicular to the first movement that the final locking occurs by the locking of the snap-in elements. This division of directions and apparatus therefor permits the keeping of the movement distance for connection as short as desired so that even in tight spatial circumstances, such as inside a television receiver, a rigid securement of the loudspeaker enclosure by means of a form-fit snap-in connection can be achieved.

DESCRIPTION OF THE DRAWINGS

The invention is illustrated below by means of the drawings wherein:

FIG. 1 shows one embodiment of the present invention,

FIG. 2 shows the locking mechanism of the loudspeaker enclosure of FIG. 1.

FIGS. 3 and 4 show alternate embodiments of the "snap-in" members of FIG. 1.

DETAILED DESCRIPTION OF THE PREFERRED EMBODIMENT

Figure 5:
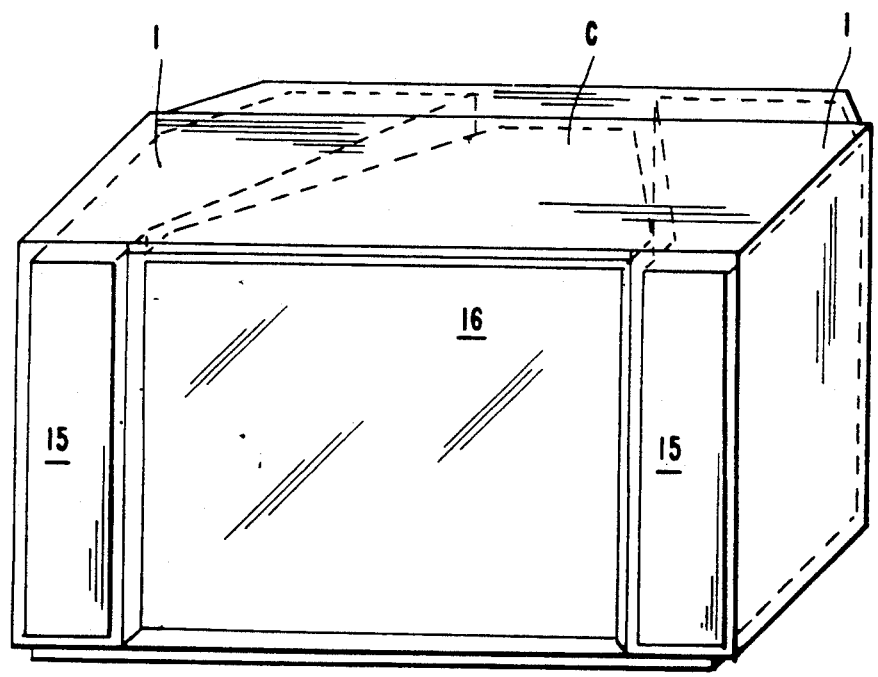
FIG. 5 shows the assembled television receiver.

FIG. 1 shows the loudspeaker enclosure 1 which comprises the two sections 1a and 1b. The outside shape of the enclosure 1 is adapted to the shape of a picture tube in a television receiver, so that the space between the case wall and the picture tube is utilized in an optimized way for the housing enclosure to be as small as possible. At the backend of enclosure 1, facing the back wall B, the enclosure 1 at each of its opposing sides is fitted with a projecting part or detent member 2 which has a first angular face 3 and a second angular face 4. At the front side F, i.e. facing in the same direction as picture tube, the loudspeaker enclosure 1 is fitted with two rigid projecting parts 5. At the side wall of the case c of the television receiver, the plastic part 6 is affixed which at both sides each has a resilient bracket 7 with each having a rectangular-shaped opening 8.

Referring now to FIGS. 1 and 2, the connecting of the enclosure 1 to the part 6 of the case C occurs as follows: The enclosure 1 is first pushed in between the side wall of the case and the picture tube from the back in a translational movement in the direction of arrow 9 so that the projecting parts 5 lock into pocket-hole-shaped recesses 10 (FIG. 2) at the part 6. The angular face 3 thereby acts upon the resilient bracket 7 in such a way that the latter is pushed outwards in the direction of arrow 11. In the final position of the movement in the direction of arrow 9 the projecting parts 5 totally lock into the recesses 10. At the backside end B, i.e. in the area of the projecting parts 2, the enclosure 1 is in this position is not yet locked with the part 6 and the case. However, subsequent to this translational movement in the direction of arrow 9, the enclosure 1 is pressed down at the backside end in a small rocking motion about one axis along the projecting parts 5 in the direction of the arrow 12. During this movement which amounts to only a few millimeters the angular face 4 acts upon the bracket 7 until finally the projecting part 2 looks into the adjusted opening 8 in a form-fit way and the bracket 7 springs back opposite to the direction of arrow 11. Now, the enclosure 1 is secured in a form-fit way and free from backlash, and is affixed to the part 6 and the case of the television receiver by means of the lock-in of the projecting parts 5 into the recesses 10 with the lock-in Of the projecting parts 2 into the openings 8.

FIG. 2 generally shows the final locking of the enclosure 1 at the part 6 which is part of the case in a top view of the interior of the case. The part 6 at its backside end B also has a shoulder 13 behind which the backside end of the enclosure 1 locks in during the movement in the direction 12. The shoulder 13 in addition to the brackets serves as support of the relatively heavy loudspeaker enclosure 1. Projections 5 are shown engaged into recesses or slats 10. Projections 5 are each configured with a base portion proximal enclosure 1, and a distal portion for engaging the slats 10 with one side of projections 5 being sloped so that the distal portion is narrower than the base portion to facilitate ease of insertion of projection 5 into slat 10.

According to FIG. 3 the two angular faces 3 and 4 of FIG. 1 are parts of a three-dimensional truncated cone quarter 14 which locks into a seat shaped accordingly. This truncated cone quarter also can, for reasons of plastics injection molding technique, consist of single segments the envelope of which forms the shown truncated cone quarter.

FIG. 4 shows another embodiment of the shape of the angular faces 3 and 4. In this embodiment, the slide faces 3 and 4 are no longer constructed as angular planes but follow a bent course with increasing bending radius.

FIG. 5 shows an assembled television receiver with the two loudspeaker enclosures 1 assembled to case C. The loudspeakers are disposed on faces 15 of respective enclosures 1 and the face of the CRT is disposed on face 16 of case C.

What is claimed is:

1. In a television system having a cabinet containing a picture tube, apparatus comprising:
   a speaker enclosure having one side shaped similarly to the shape of said picture tube;
   first coupling means for coupling a first area of said enclosure to said cabinet in response to a first translation motion of said enclosure in the axial direction of said picture tube which places said speaker enclosure inside said cabinet between said picture tube and said cabinet with said shaped side next to said picture tube; and
   second coupling means for coupling a second area of said enclosure to said cabinet in response to said first translational motion and a second translational motion of said enclosure, said second translation motion being substantially normal to said axial direction of said picture tube and being stringently confined by the distance between said cabinet and said picture tube;
   said second coupling means including a projecting member attached to said speaker enclosure and a bracket member attached to said cabinet, said bracket member having an opening for receiving said projecting member;
   said projecting member having first and second sloped portions for engaging an area of said bracket member adjacent to said opening and for gradually urging said bracket member away from said speaker enclosure as said speaker enclosure is moved during said first and said second translational motions;
   said projecting member having a second portion which engages an area of said bracket member defining at least a portion of the perimeter of said opening and which locks said speaker enclosure to said cabinet after completion of said first and said second translational motions.

2. The apparatus of claim 1 wherein:
   side first coupling means includes a plurality of recesses spaced along a portion of said cabinet and a plurality of projections on a face of said speaker enclosure spaced equally to the spacing of said recesses;
   said plurality of projections engaging said plurality of recesses in response to said first translational motion.

3. The apparatus of claim 2, wherein:
   each of said plurality of projections included in said first coupling means are configured with a base portion proximal said speaker enclosure and a distal portion for engaging said recesses, one side of said projections being sloped so that the distal portion is narrower than the base portion.

4. The apparatus of claim 1, wherein:
   said first and second sloped portions of said projecting member are planar surfaces.

5. The apparatus of claim 1, wherein:
   said first and second sloped portions of said projecting member each have a bent course with increasing bending radius.

6. The apparatus of claim 1, wherein:
   said projecting member is configured as a section of a truncated cone oriented with respect to said bracket member so as to gradually urge said bracket member away from said speaker enclosure during said first and said second translational motions.

7. In a television system having a cabinet containing a picture tube, apparatus comprising:
   a speaker enclosure having one side shaped similarly to the shape of said picture tube;
   first coupling means for coupling a first area of said enclosure to said cabinet in response to a first translational motion of said enclosure in the axial direction of said picture tube which places said speaker enclosure inside said cabinet between said picture tube and said cabinet with said shaped side next to said picture tube; and
   second coupling means for coupling a second area of said enclosure to said cabinet in response to said first translational motion and a second translational motion of said speaker enclosure, said second translational motion being substantially normal to said axial direction of said picture tube and being stringently confined by the distance between said cabinet and said picture tube;
   said second coupling means including resilient retainer members affixed to said cabinet and spaced to closely receive said speaker enclosure;
   said second coupling means also including detent members arranged on opposite sides of said enclosure;
   said resilient retainer members each having an aperture for receiving one of said detent members;
   said detent members having first and second sloped portions for engaging said resilient retainer member adjacent to said aperture and for gradually urging said resilient retainer members away from said speaker enclosure as said speaker enclosure is moved in said first and said second translational motions;
   said detent members having a second portion which engages an area of said resilient retainer members defining at least a portion of the perimeter of said opening and which locks said speaker enclosure to said cabinet after completion of said first and said second translational motion.

8. The apparatus of claim 7, wherein:
   said first coupling means includes a plurality of recesses spaced along a portion of said cabinet and a plurality of projections on a face of said speaker enclosure spaced equally to the spacing of said recesses;

said plurality of projections engaging said plurality of recesses in response to said first translational motion.

9. The apparatus of claim 8, wherein:

each of said plurality of projections included in said first coupling means are configured with a base portion proximal said speaker enclosure and a distal portion for engaging said recesses, one side of said projections being sloped so that the distal portion is narrower than the base portion.

10. The apparatus of claim 7, wherein:

said first and second sloped portions of said detent member are planar surfaces.

11. The apparatus of claim 7, wherein:

said first and second sloped portions of said detent member each have a bent course with increasing bending radius.

12. The apparatus of claim 7, wherein:

said detent member is configured as a section of a truncated cone oriented with respect to said resilient retainer member so as to gradually urge said resilient retainer member away from said speaker enclosure during said first and said second translational motions.

* * * * *